Patented Dec. 13, 1932

1,890,793

UNITED STATES PATENT OFFICE

ERICH NOACK, OF WIESDORF-ON-THE-RHINE, AND OSWIN NITZSCHKE, OF LEVERKUSEN-ON-THE-RHINE, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

PROCESS FOR THE EXECUTION OF GAS REACTIONS

No Drawing. Application filed October 13, 1927, Serial No. 226,036, and in Germany October 20, 1926.

The present invention concerns a process for the execution of gas reactions in which liquid or solid reaction products are produced by subjecting gas mixtures to silent electrical discharges.

Various reactions are known in which when gases or gas mixtures are subjected to silent electrical discharges, liquid or solid reaction products or solutions thereof are produced, which deposit on the walls of the discharge chamber in the form of drops, streaks, small crystals and the like.

According to the present invention in carrying out gas reactions by subjecting gas mixtures within a discharge chamber to silent electrical discharges, whereby solid or liquid reactions are produced, care is taken that the reaction products completely or in part are prevented from depositing on the walls of the discharge chamber. The new process represents a considerable advance compared with the customary method of working, since a greater yield is obtained in the reaction chamber with a reduced expenditure of energy. Thus also, when effecting the condensation at an elevated temperature the consumption of the cooling water may in certain instances be reduced to one tenth or less; the electrical energy applied may in part be utilized in the form of hot water or steam; conversely the possibility of a higher efficiency of the discharge tube is rendered feasible (by increasing the voltage or frequency) without having to make provisions for the otherwise very difficult cooling of the interior tube.

Deposition in the tube can be prevented in various ways, for example, by irrigating the inner wall of the discharge chamber with a suitable liquid, for instance, water, or by avoiding saturation of the gas mixture with the reaction products in known manner, such as by suitable dilution with a gas taking part in the reaction or with an indifferent gas, or by working at a temperature above the dew point of the mixture. In the latter case there is simultaneously the advantage of an economy in cooling water; it is even possible to utilize the considerable energy not used for the reaction for the purpose of producing hot water or steam.

The following examples will illustrate our invention:

*Example 1.*—Through a glass discharge tube, the ringshaped discharge room of which has a diameter of 6 mm. and a length of 1250 mm., and which is worked by an alternating current of 50 cycles with 18,000 volts. A hydrogen-oxygen mixture containing 3% of oxygen is passed through at a speed of 100 litres per hour, the tube consumes 160 watts and yields per hour 1.18 grams of hydrogen peroxide at a total consumption of energy of 136 kilowatt hours per kilogram of hydrogen peroxide.

If now while maintaining all other conditions the condensation within the tube is prevented by diluting the gas mixture with 7 times its volume of hydrogen, thus increasing the speed of the gas mixture to 800 litres per hour, the yield was raised to 1.52 grams of hydrogen peroxide per hour, whilst the energy consumption was reduced to 108 kilowatt hours per kilogram of hydrogen peroxide.

*Example 2.*—In the discharge tube described in Example 1 the same electrical conditions and water cooling are maintained at a speed of the gas mixture (hydrogen plus 3% oxygen) of 200 litres whereby 1.25 grams of hydrogen peroxide per hour are obtained at a consumption of energy of 131 kilowatt hours per kilogram of hydrogen peroxide. Condensation was prevented by allowing the temperature of the cooling water to rise to 40° C. (tube temperature), whereby the yield was raised to 1.43 grams of hydrogen peroxide per hour, whilst the consumption of energy was reduced to 112 kilowatt hours per kilogram of hydrogen peroxide.

*Example 3.*—When the discharge tube was worked, as in Example 2, but the cooling was arranged in a manner that the temperature of the cooling water rose to 100° C. the yield remained just as favourable as at 40° C. in Example 2. However, the consumption of the cooling water supply was reduced to one twentieth, while the energy not consumed in the production of hydrogen peroxide, which was heretofore lost with the condensing water, is now recovered in the form of boiling water.

In the same way formic acid can be produced from $CO$ and $H_2O$, or $CO_2$ and $H_2O$, or $CO_2$ and $H$; formic aldehyde from $CO$, $H$ and steam, and acetic aldehyde from $CO$ and $CH_4$ etc.

We claim:

1. The process which comprises passing a mixture of hydrogen and oxygen through a zone of silent electrical discharges while subjecting said mixture to silent electrical discharges and maintaining the temperature of said mixture and of the resulting reaction products above their dew points while in said zone.

2. The process which comprises passing a mixture of 97% hydrogen and 3% oxygen with a speed of 200 liters per hour through a discharge tube of a diameter of 6 mm. and a length of 1250 mm. which is worked by an alternating current of 50 cycles and 18,000 volts and maintaining the temperature of the reaction mixture at about 100° C., by cooling the same.

In testimony whereof we have hereunto set our hands.

ERICH NOACK.
OSWIN NITZSCHKE.